United States Patent
Mityushin et al.

(10) Patent No.: US 7,075,298 B2
(45) Date of Patent: Jul. 11, 2006

(54) METHOD AND APPARATUS FOR WELL LOGGING USING NMR WITH A LONG CONDUCTIVE RARE-EARTH MAGNET AND EXCITATION COMPENSATION IN THE AREA OF THE LONG MAGNET

(75) Inventors: Evgeny M. Mityushin, Tver (RU); Rafis T. Khamatdinov, Tver (RU); Vadim J. Barlyaev, Tver (RU)

(73) Assignee: Karotazh (RU)

( * ) Notice: Subject to any disclaimer, the term of this patent is extended or adjusted under 35 U.S.C. 154(b) by 0 days.

(21) Appl. No.: 10/466,232

(22) PCT Filed: Dec. 20, 2001

(86) PCT No.: PCT/RU01/00557

§ 371 (c)(1),
(2), (4) Date: Jul. 11, 2003

(87) PCT Pub. No.: WO02/057809

PCT Pub. Date: Jul. 25, 2002

(65) Prior Publication Data

US 2004/0052116 A1   Mar. 18, 2004

(30) Foreign Application Priority Data

Jan. 19, 2001   (RU) .............................. 2001101813

(51) Int. Cl.
*G01V 3/00* (2006.01)
(52) U.S. Cl. .................................................... 324/303
(58) Field of Classification Search ................ 324/303, 324/306

See application file for complete search history.

(56) References Cited

U.S. PATENT DOCUMENTS 3,667,035 A   5/1972   Slichter (Continued)

FOREIGN PATENT DOCUMENTS

EP   0618458 A2   10/1994

(Continued)

OTHER PUBLICATIONS

R.N. Chandler, E.O. Drack, M.N. Miller, and M.G. Prammer, Improved Log Quality With a Dual-Frequency Pulsed NMR Tool, SPE International, Sep. 1994, pp. 23-35, SPE 28365 Presented at the 69th Annual Technical Conference and Exhibition, New Orleans, LA, U.S.A.

(Continued)

*Primary Examiner*—Diego Gutierrez
*Assistant Examiner*—Tiffany A. Fetzner
(74) *Attorney, Agent, or Firm*—Mark A. Oathout

(57) ABSTRACT

The invention relates to methods for prospecting wells using nuclear magnetic resonance. The inventive method consists in generating a static magnetic field near a well with the aid of a magnet which is made of a conductive rear-earth material in the form of an elongated parallelepiped which is magnetized in a direction perpendicular to a large side surface and longitudinal axis thereof. The width of the magnet is of at least twice as large as the narrow side of said parallelepiped. A radio-frequency coil is arranged on a frame whose diameter is equal to or higher than a diagonal of the cross-section section of a magnet arranged inside the frame. The coil elements are arranged on planes which are parallel to the longitudinal axis of the magnet and vertical with respect to the smaller side thereof arranged in symmetrical sectors which are opposite to the large side surface of the magnet. A compensating unit is arranged along the large side surfaces of the magnet parallel to the longitudinal axis thereof.

5 Claims, 3 Drawing Sheets

U.S. PATENT DOCUMENTS

| | | | |
|---|---|---|---|
| 4,350,955 A | 9/1982 | Jackson et al. | |
| 4,710,713 A | 12/1987 | Strikman | |
| 4,717,877 A | 1/1988 | Taicher et al. | |
| 5,055,787 A | 10/1991 | Kleinberg et al. | |
| 5,212,447 A | 5/1993 | Paltiel | |
| 5,376,884 A * | 12/1994 | Sezginer | 324/303 |
| 5,486,761 A * | 1/1996 | Sezginer | 324/303 |
| 6,069,479 A * | 5/2000 | Taicher et al. | 324/309 |
| 6,118,272 A | 9/2000 | Taicher et al. | |
| 6,163,151 A * | 12/2000 | Wisler et al. | 324/303 |
| 2004/0052116 A1* | 3/2004 | Mityushin et al. | 365/200 |
| 2004/0066194 A1* | 4/2004 | Slade et al. | 324/318 |

FOREIGN PATENT DOCUMENTS

| | | |
|---|---|---|
| EP | 0618458 A3 | 10/1994 |
| GB | 2 325 981 A | 9/1998 |
| GB | 2 343 521 A | 10/2000 |
| GB | 2 387 233 B | 5/2005 |
| RU | 2104565 C1 | 2/1998 |
| SU | 577498 A | 4/2000 |
| WO | WO 00/14576 * | 3/2000 |
| WO | WO 01/07937 | 2/2001 |
| WO | PCT/RU01/00557 | 4/2002 |

OTHER PUBLICATIONS

R M Grechishkin, L E Afanasteva, Yu G Pastushenkov and N N Maksimov, Analysis of a Linear Position Sensor With a Hall Effect Element, Meas. Sci. Technol. 5, 1994, pp. 853-860, JOP Publishing Ltd., Department of Physics, Tver, Russia.

Dr. Susan Dewar, Patents Act 1977 Examination Report under Section 18(3), Jul. 23, 2004, 2 pages, The EuropeanPatent Office.

* cited by examiner

METHOD AND APPARATUS FOR WELL LOGGING USING NMR WITH A LONG CONDUCTIVE RARE-EARTH MAGNET AND EXCITATION COMPENSATION IN THE AREA OF THE LONG MAGNET

CROSS-REFERENCE TO RELATED APPLICATIONS

This application claims the benefit of Russian Patent Application No. RU 2001101813 filed 19 Jan. 2001 & International Application No. PCT/RU01/00557 filed 20 Dec. 2001.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

Field of the Invention

The invention relates to geophysical methods for sensing wells, and in particular to nuclear magnetic logging (NML) used to study oil and gas wells.

NML methods exist which use strong solenoid magnets to generate a static magnetic field in an area located near the wellbore wall, and which generate a radio frequency field in this area, predominantly perpendicular to the static magnetic field, and receive the nuclear magnetic resonance signals [1, 2]. However, these methods have not gained wide application.

An NML method exists which includes use of a system of focusing magnets to generate a uniform static magnetic field in the area located opposite the system of magnets in direct proximity to the wellbore wall, generate a radio frequency field in this area, with the direction of the radio frequency field being predominantly perpendicular to the static magnetic field, and receive this nuclear magnetic resonance signal from this area [3].

The defect of this method is the shallow depth of the sensing zone, which is located at a distance of the order of 3 cm from the wall of the sonde. In wellbores with voids, the sensing region is in the wellbore area, which leads to spurious results.

The closest to the technical solution applied for is the nuclear magnetic logging method in U.S. Pat. No. 4,710,713 which includes generation of a static magnetic field near the wellbore in the region to be analyzed, using at least one magnet with a long longitudinal axis and a direction of magnetization running predominantly perpendicular to said axis, the generation of a radio frequency field to excite atomic nuclei of the material analyzed in said region, using at least one coil wound so that the turns of the coil are on the planes predominantly parallel to said direction of magnetization and said longitudinal axis, and reception of the nuclear magnetic resonance signals from the excited nuclei to obtain information on the properties of the material analyzed [4, sections 1, 6].

The device using this method consists of a circular cylindrical magnet made of ferrite and magnetized perpendicular to its long axis, and a radio frequency coil wound directly on the magnet, with the coil turns primarily lying on the plane passing through the axis of the magnet and the direction of its magnetization [4, sections 14, 15, 16], a radio pulse generator, a nuclear magnetic resonance signal receiver and a matching device; the start of the radio frequency coil is connected to the first input of said matching device, and the end of said coil is connected to the common point on the matching device; the output of the radio pulse generator is connected to the second input of said matching device, while the output of the matching device is connected to the input of the nuclear magnetic resonance signal receiver [4, 4].

The advantage of this method and device is that the sensing zone lies in a thin (of the order of 1 mm) cylindrical region coaxial with the axis of the sonde, at a significant distance from its axis. For a sonde with diameter of 152 mm, the sensing zone is located at a distance of 175 mm from its axis, and is hardly ever in the region of the wellbore with the standard diameter of 200 mm [5].

The defect is that, as the sonde diameter decreases (to 114 mm, for example), the sensitivity of the sonde and the radius of the investigation zone decrease, and thus it can only operate in small-diameter wellbores [5]. This defect is caused by the fact that the prototype device [4] used a circular cylindrical nonconducting ferrite magnet, while the radio frequency coil was wound directly on the surface of the magnet [4, sections 14, 15, 16].

SUMMARY OF THE INVENTION

The problem of increasing the sensing sensitivity and depth of nuclear magnetic logging using small-diameter sondes is solved by the embodiment(s) of the invention proposed.

The problem stated is solved as follows. In the nuclear magnetic logging method including generation of a static magnetic field in the wellbore, in the region to be analyzed, using one of several magnets made of a conducting rare-earth material with the longitudinal axis and a direction of magnetization running primarily perpendicular to such axis, generation of the exciting radio frequency field in the direction perpendicular to both the axis and the static magnetic field, and reception of the nuclear magnetic resonance signals from the excited nuclei, and also a compensating device such as a compensating coil generates a compensating radio frequency field in the area of the magnet.

In addition, in the nuclear magnetic logging apparatus having at least one long magnet, magnetized perpendicular to its longitudinal axis, and a radio frequency coil creating a field perpendicular to the field of the magnet, a radio pulse generator, a nuclear magnetic resonance signal receiver and a matching device, with the start of the radio frequency coil connected to the first input of the matching device and the end of the coil connected to the common point of the matching device, to the second input of which the output of the radio pulse generator is connected, while the output of the matching device is connected to the input of the nuclear magnetic resonance signal receiver, the magnet is made of a conducting rare-earth material in the form of an elongated parallelepiped. It is magnetized perpendicular to its longitudinal axis and wide lateral surface. The width of the magnet is twice the width of its narrow side, while the radio frequency coil is wound on a cylinder with a diameter at least equal to the diagonal of the cross section of the magnet located inside the cylinder. The turns of the coil lie on planes parallel to the longitudinal axis of the magnet and perpendicular to its narrow side in symmetric sectors located opposite the wide lateral surfaces of the magnet, while a compensating device is placed along the wide lateral surfaces of the magnet, parallel to its longitudinal axis.

In addition, the compensating device has a coil with its beginning connected to a common point on the matching device, while its end is connected to one end of the radio frequency coil. The ratio of the coils of the radio frequency coil to the compensating coil is equal to the ratio of the diameter of the radio frequency coil to the thickness of the magnet.

In addition, the compensating device has a shorted coil made of a material with resistivity less than $2.5 \times 10^{-8}$ ohms·m.

The improvement in this nuclear magnetic logging method in comparison with the prior technique is that compensation of the radio frequency field in the area of the magnet is proposed. For this compensation, a radio frequency field is also generated in the area of the magnet, directed toward and equal in strength to the exciting radio frequency field in the area of the magnet.

The improvement in the design of the nuclear magnetic logging apparatus is that the magnet is made of a conducting rare-earth material in the shape of a long parallelepiped magnet that is magnetized perpendicular to its longitudinal axis and wide lateral surface, while the radio frequency coil is wound on a cylinder with diameter no less than the diagonal of the cross section of the magnet located inside the cylinder. The turns of the coil lie on planes parallel to the longitudinal axis of the magnet and parallel to its narrow side in symmetric sectors located opposite the wide lateral surface of the magnet. A compensating device is arranged along the wide lateral surfaces of the magnet, parallel to its longitudinal axis.

Another improvement is that the compensating device has a coil with its beginning connected to the common point on the matching device, while its end is connected to an end of the radio frequency coil. The ratio of the turns of the radio frequency coil to the compensating coil is equal to the ratio of the diameter of the radio frequency coil to the thickness of the magnet.

Another improvement is that the compensating device has a shorted coil made of a material with resistivity less than $2.5 \times 10^{-8}$ ohms·m.

Examination of known solutions in science and technology relating to logging methods using nuclear magnetic resonance and devices for implementing it has shown that there is no identical solution.

In the prior known devices and the closest prior device [4], there is no additional field which compensates for the radio frequency field in the area of the magnet. Therefore, it is repeatedly emphasized in the prior art device (see sections 14, 15, 16) and the methods for application of it (sections 19, 26) that such prior magnet is made in the shape of a long circular cylinder of ferrite having "nonconducting" properties, while the radio frequency coil is wound directly on the magnet. Such apparatus is inoperable if these requirements are not satisfied.

Any materials (except dielectrics) placed inside the radio frequency coil lead to losses in the radio frequency coil. This is manifested as a decrease in the Q-factor of the coil at the resonance frequency and ultimately a decrease in the signal-to-noise ratio at the output of the apparatus. Therefore, a ferrite magnet with "nonconductive" properties is used in the prior art device.

Since a ferrite magnet has low residual magnetization, it is made round in the prior art to obtain the maximum field strength.

The long circular cylindrical magnet in the prior art creates a static magnetic field with strength and direction at each point in the space surrounding it which can be determined using the following expression [6, 7]:

$$H_r = H_0 \cdot \left[ \begin{array}{c} \left(\frac{R}{r}\right)^2 \cdot \text{SIN}(\varphi) - \frac{1}{3}\left(\frac{R}{r}\right)^4 \cdot \\ \text{SIN}(3\varphi) + \frac{1}{5}\left(\frac{R}{r}\right)^6 \cdot \text{SIN}(5\varphi) + \ldots \end{array} \right] \quad (1)$$

$$H_\varphi = -H_0 \cdot \left[ \begin{array}{c} \left(\frac{R}{r}\right)^2 \cdot \text{COS}(\varphi) - \frac{1}{3}\left(\frac{R}{r}\right)^4 \cdot \\ \text{COS}(3\varphi) + \frac{1}{5}\left(\frac{R}{r}\right)^6 \cdot \text{COS}(5\varphi) + \ldots \end{array} \right]$$

where $H_r$, $H_\varphi$ are the radial and tangential components of the field of the magnet at a point with coordinates r, $\varphi$ in a cylindrical coordinate system with an axis coinciding with the axis of the magnet, and $H_0$ is the field strength at the surface of a magnet with radius R.

At a distance $r \geq 2R$ from the axis, the field of the magnet practically contains only the first harmonic from expression (1). This field is homogeneous (in magnitude) in the azimuthal direction at fixed radius $r_p$.

The quantity $H_0$ is directly proportional to the magnitude of the residual magnetism of the magnet material $B_r$. Ferrite has a residual magnetism $B_r = 3000-4000$ gauss, and the rare-earth material NdFeB has $B_r = 10,000-11,000$ gauss.

A sensing zone $r_p = 170-180$ mm from the axis of the sonde in the prior art with field strength in this zone of the order of 165–170 gauss is generally selected for nuclear magnetic logging [5]. A ferrite magnet with diameter of 120 mm is required to obtain this field strength in this sensing zone. However, a magnet made of NdFeB will have diameter of 65–70 mm. Therefore, the switch to a magnet made of NdFeB creates the prerequisites for fabricating a nuclear magnetic logging sonde with smaller diameter without reducing the radius of the sensing zone.

A magnet made of ferrite as used in the prior art is "nonconducting".

The prior art radio frequency coil wound on its surface has a Q-factor of the order of 100 [5]. A magnet made of NdFeB conducts the electrical current better, and the radio frequency coil wound on its surface will have a Q-factor of no more than 20. To reduce the losses in the radio frequency coil, it is necessary to reduce the cross section surface of the material inserted inside the radio frequency coil and intersecting the electromagnetic flux of such coil, and to eliminate the radio frequency field in the area of the material inserted inside the coil.

The proposed new method and apparatus for nuclear magnetic logging make it possible to solve these problems.

Compensation of the radio frequency field in the area of the magnet is proposed to eliminate the additional losses caused by the change in the material of the magnet.

However, field compensation in the area of the magnet leads to a decrease in the exciting radio frequency field in the area of the substance analyzed. If the radii of the radio frequency coil and compensating coil are equal, there will be no field in the area of the magnet, but there will also not be any field in the sensing zone. It is necessary to reduce the cross section of the magnet intersected by the radio frequency field in comparison to the radius of the radio frequency coil.

For this, it is proposed that the shape of the magnet be changed. The magnet is made thinner in the plane perpendicular to the direction of the flux of the radio frequency coil and wider in the direction of magnetization of the magnet.

The field of a magnet that is in the shape of a long parallelepiped is described by an expression analogous to (1). However, form coefficients, which are functions of the ratio of the wide and narrow walls of the magnet, appear in front of each of the terms of series (1). For the first harmonic of the field, which is of interest to us, at a distance $r=r_p$ this ratio has the form:

$$H_r = H_0 \cdot \frac{h}{D} \cdot \left(\frac{R}{r}\right)^2 \cdot \text{SIN}(\varphi) \quad (2)$$

$$H_\varphi = -H_0 \cdot \frac{h}{D} \cdot \left(\frac{R}{r}\right)^2 \cdot \text{COS}(\varphi)$$

where h is the narrow lateral surface of the magnet, D is the wide lateral surface of the magnet, an $H_0$ is the field strength of the magnet at its narrow lateral surface.

For a wide lateral surface two times wider than the narrow lateral surface, the field strength in the sensing zone will be two times greater than that of a circular cylindrical magnet with diameter equal to the narrow lateral surface. A similar field strength can be obtained with a circular cylindrical magnet with diameter $\sqrt{2}$ times greater than the width of the narrow lateral surface of a rectangular magnet made of the same material.

Thus, if a magnet made of NdFeB is made in the shape of a parallelepiped with a 40 mm narrow side and an 80 mm wide side, with length of the longitudinal axis of 1000 mm, and magnetized perpendicular to the lengthwise axis and the wide side, then such a magnet will have a field in a sensing zone $r_p=170=180$ mm analogous to that of a circular cylindrical ferrite magnet 120 mm in diameter of the same length.

The radio frequency coil for a sonde with a magnet in the shape of a parallelepiped is wound on a cylinder with a diameter no less than the cross section of the rectangular magnet.

The coil turns are placed along the generatrix of the cylinder along its long axis in symmetric sectors with an angle $2\delta$ arranged opposite the wide side of the rectangular magnet.

The field strength and direction of the radio frequency coil can be determined from an expression analogous to (1):

$$H1_\varphi = H1_0 \cdot \begin{bmatrix} \text{SIN}(\delta) \cdot \left(\frac{R}{r}\right)^2 \cdot \text{SIN}(\varphi + 90°) + \\ \frac{1}{3}\text{SIN}(3\delta) \cdot \left(\frac{R}{r}\right)^4 \cdot \text{SIN}(3(\varphi + 90°)) + \\ \frac{1}{5}\text{SIN}(5\delta)\left(\frac{R}{r}\right)^6 \cdot \text{SIN}(5(\varphi + 90°)) + \ldots \end{bmatrix} \quad (3)$$

-continued $$H1_\varphi = -H1_0 \cdot \begin{bmatrix} \text{SIN}(\delta) \cdot \left(\frac{R}{r}\right)^2 \cdot \text{COS}(\varphi + 90°) + \\ \frac{1}{3}\text{SIN}(3\delta) \cdot \left(\frac{R}{r}\right)^4 \cdot \text{COS}(3(\varphi + 90°)) + \\ \frac{1}{5}\text{SIN}(5\delta)\left(\frac{R}{r}\right)^6 \cdot \text{COS}(5(\varphi + 90°)) + \ldots \end{bmatrix}$$

where $H1_r$, $H1_{100}$ are the radial and tangential components of the radio frequency field strength at a point with coordinates r, $\phi$ in a cylindrical coordinate system with an axis coinciding with the longitudinal axis of the magnet.

The field direction of the radio frequency coil at all points in the surrounding space is rotated 90° relative to the field of the magnet.

$H1_0$ is the radio frequency field strength at the wall of the radio frequency coil.

$$H1_0 = \frac{I \cdot W}{\pi \cdot \delta \cdot R}, \quad (4)$$

$$\frac{I}{\pi \cdot \delta}$$

is the current density through a radio frequency coil with radius R and a number of turns W. A radio frequency coil operates most efficiently when the turns are arranged along a cylinder in a 120° sector. Where $2\delta=120°$ the second harmonic in expression (3) is equal to zero.

Therefore, the radio frequency field in the azimuthal direction is practically uniform within the radius of the sensing zone $r_p$. Furthermore, the energy arriving from the radio pulse generator is primarily expended to create the second, useful harmonic of the radio frequency field.

The losses in the radio frequency coil will be identical when a planar magnet and a cylindrical magnet with diameter equal to the narrow side of the planar magnet are placed inside the radio frequency coil. The field strength of the planar magnet will be two times greater.

The difference between the diameter of the radio frequency coil and the thickness of the planar magnet makes it possible to use a compensating coil which is wound directly on the magnet on the plane parallel to its narrow side. The compensating coil is connected opposite the primary, radio frequency coil. Here, for complete compensation of the radio frequency field in the area of the magnet, as follows from expression (4), the ratio of the turns of the compensating coil to that of the radio frequency coil must be equal to the ratio of their radii. The absence of a radio frequency field in the area of the magnet leads to the absence of losses in the radio frequency coil caused by the presence of the magnet inside it. The strength of the useful radio frequency field in the sensing zone decreases insignificantly here, as is shown in FIG. 4. For example, if the thickness of the magnet is 40 mm, while the diameter of the radio frequency coil is 100 mm, then the radio frequency field in the operating zone of the sonde will decrease by only 16%.

The proposed apparatus for compensating for the losses in the radio frequency coil operates efficiently, but is difficult to manufacture in a number of cases. For the high frequencies at which NML is used, the radio frequency coil has few turns. Therefore, it is difficult to select the turns of the compensating coil. In this case, a shorted turn is mounted on the magnet. A shield made of highly conductive material applied to the surface of the magnet (a copper foil shield, for example) serves as the shorted turn. This statement is confirmed by the experimental data provided in FIG. 5. Physically, the shield works like a compensating coil. Currents from the radio frequency coil are induced in the shield, and they compensate for the radio frequency field in the area of the magnet.

Thus, the combination of the change in the shape and material of the magnet, the design of the radio frequency coil and the addition of a compensating device makes it possible to obtain a new quality, specifically, the sensing zone and sensitivity of the instrument remain unchanged, but the sonde diameter is smaller.

All of the above demonstrates that the invention applied for is new, is an improvement and can be used to create nuclear magnetic logging sondes.

BRIEF DESCRIPTION OF THE DRAWINGS

The technological essence of the invention is explained by the drawings, where.

DESCRIPTION OF THE PREFERRED EMBODIMENT

Figure 1:
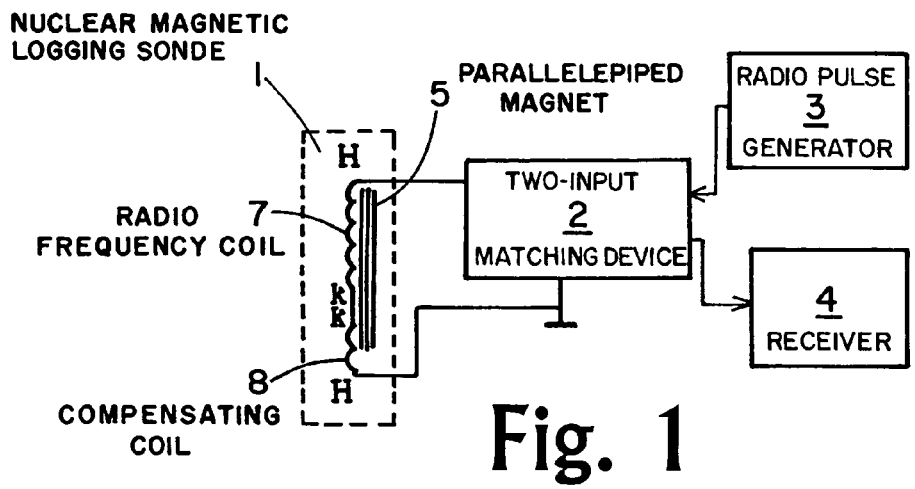
FIG. 1 shows a block diagram of the NML apparatus.
Figure 2:
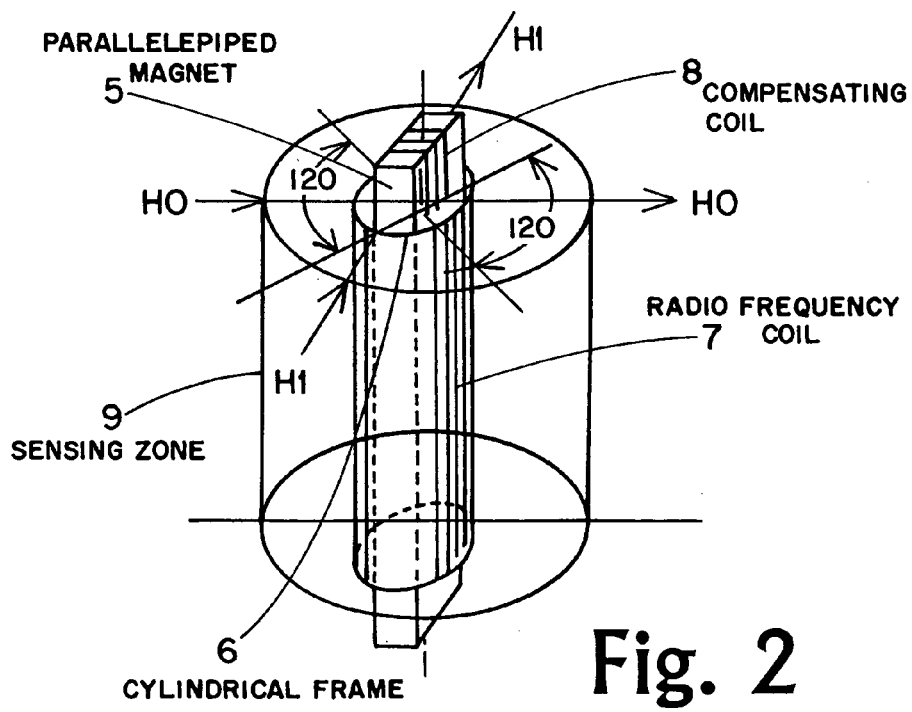
FIG. 2 shows the general view of the NML sonde.
Figure 3:
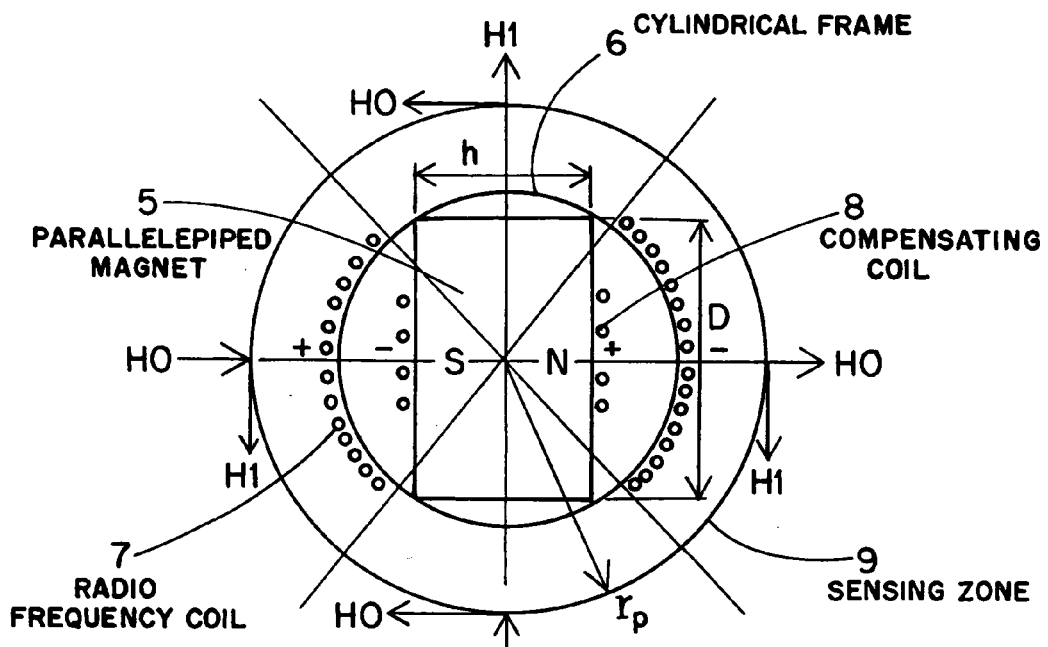
FIG. 3 shows the cross section of the NML sonde.

The nuclear magnetic logging apparatus was designed as follows: it has as shown in FIG. 1, a nuclear magnetic logging sonde 1, matching device 2, radio pulse generator 3 and receiver 4. Nuclear magnetic logging sonde 1 comprises a long magnet made in the shape of a parallelepiped 5 (shown in FIGS. 1, 2, and 3) and magnetized perpendicular to its long axis and wide side. The magnet is inserted in cylindrical frame 6 (shown in FIGS. 2, and 3), on which radio frequency coil 7 (shown in FIGS. 1, 2, and 3) is wound. The coil is wound in 120° symmetric sectors arranged opposite the wide side of magnet 5. The turns of radio frequency coil 7 lie on the planes parallel to the narrow side of magnet 5. Compensating coil 8 (shown in FIGS. 1, 2, and 3) with turns parallel to the turns of radio frequency coil 7 is wound on magnet 5. The beginning of radio frequency coil 7 is connected to the first input of matching device 2, while its end is connected to the end of compensating coil 8. The beginning of the compensating coil 8 is connected to the common point of matching device 2. The output of radio pulse generator 3 is connected to the second input of the matching device, while the output of the matching device is connected to the input of receiver 4.

The magnet is made of NdFeB in the shape of a parallelepiped 1000 mm long, 80 mm wide, with a narrow lateral side of 40 mm. The magnet 5 is magnetized perpendicular to the longitudinal axis and the wide lateral surface. A shield of copper sheet 0.5 mm thick is applied to the surface of the magnet and covers its lateral surfaces along its entire length.

The radio frequency coil 7 is made of a glass cloth base laminate cylinder 800 mm long with an inner diameter of 100 mm and an outer diameter of 102 mm. The turns of the coil 7 are applied to the outer surface of the cylinder 6 along its length, in symmetric 120° sectors. The ends of the winding are also on the outside of the cylinder 6. The radio frequency coil 7 is connected to the input of the matching device 2. A magnet 5 is inserted inside the radio frequency coil 7 so that the turns of the coil 7 are opposite its wide lateral surface.

The nuclear magnetic logging apparatus works as follows.

Figure 4:
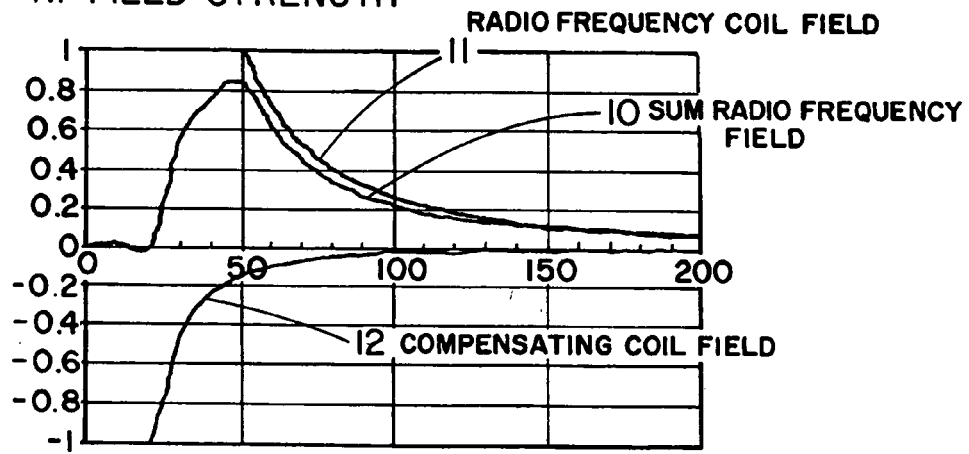
FIG. 4 shows the variations of the field of the radio frequency coil, the field of the compensating coil and the sum radio frequency field as functions of the distance from the narrow lateral surface of the magnet.

Magnet 5 induces a plane-parallel static magnetic field with magnitude H0 at a radial distance $r_p$ from the axis of the magnet. The field magnitude H0 is constant over the entire circle with radius $r_p$. The direction of this field differs at different points on the circle. Radio frequency coil 7 together with compensating coil 8 generates a sum plane-parallel radio frequency field H1, which has the same constant magnitude at radius $r_p$. The direction of the radio frequency field H1 is perpendicular to the field H0 at each point on a circle of radius $r_p$. When the frequency of the radio frequency field H1 matches the precession frequency of the hydrogen nuclei in field H0 in sensing zone 9 (shown in FIGS. 2, and 3), the nuclear magnetic resonance phenomenon appears. The nuclear magnetic resonance signal is picked up by the same radio frequency coil 7. FIG. 4 shows a graph of the RF field strength where the sum radio frequency field 10 consists of the field 11 created by radio frequency coil 7 and field 12 created by the compensating coil 8. There is no radio frequency field in the area of the magnet 5, and the field varies insignificantly in sensing zone 9.

Figure 5:
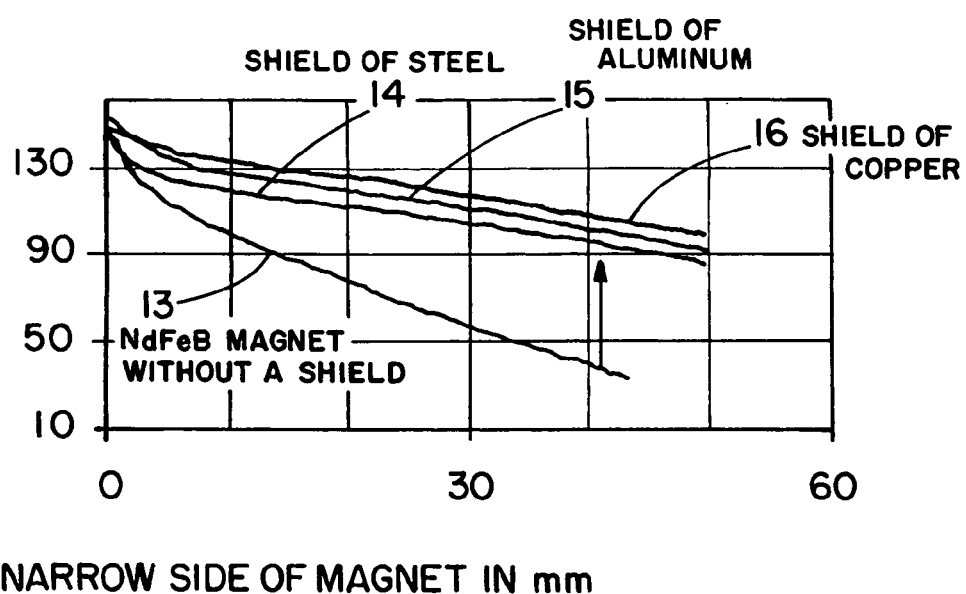
FIG. 5 shows the experimental data obtained at a frequency of 500 kHz using a radio frequency coil 100 mm in diameter with 4 turns, inside which a magnet made of NdFeB of varying thickness and the same magnet with a shield made of various materials are inserted.

FIG. 5 shows a representation wherein a shield made of a highly conductive material applied to the magnet surface can serve as the compensating coil 8. In this case, the sum radio frequency field varies according to the same law as the sum radio frequency filed 10 discussed above. The change in the Q-factor of the radio frequency as a function of the material and width of the shield is shown in:

13—a magnet made of NdFeB without a shield;
14—a shield made of steel with resistivity of $42 \times 10^{-8}$ ohms·m;
15—a shield made of aluminum with resistivity of $2.5 \times 10^{-8}$ ohms·m;
16—a shield made of copper with resistivity of $1.55 \times 10^{-8}$ ohms·m.

As can be seen from the figure, the changes in the Q-factor are smallest material with resistivity less than $2.5 \times 10^{-8}$ ohms·m is placed inside the coil 7, and largest when a magnet made of NdFeB without a shield is placed inside the coil 7. When the NdFeB magnet is covered with copper foil, the radio frequency coil 7 will only sense the copper foil.

COMMERCIAL APPLICATION

The absence of a radio frequency field in the area of the magnet 5 makes it possible to use any materials for the magnet 5, including conducting rare-earth materials, NdFeB for example. Since rare-earth magnets have significantly higher residual magnetization than ferrite, the NML sonde can have a smaller diameter but still retain the same sensing radius. A sonde for NML was tested in wellbores up to 4500 m deep at temperatures up to 120° C. It is possible to use the invention in high-temperature wellbores.

What is claimed is:

1. An improved logging method using nuclear magnetic resonance including generating a static magnetic field near a wellbore using at least one long magnet having a direction of magnetization passing predominantly perpendicular to a longitudinal axis of the long magnet, generating an excitation radio frequency field in a region in a direction perpendicular to the longitudinal axis of the long magnet and to the static magnetic field, and receiving nuclear magnetic resonance signals, the improvement comprising:

wherein the long magnet used in the step of generating the static magnetic field is made of a conducting rare-earth material; and generating a separate radio frequency field which compensates for the excitation radio frequency field in the area of the long magnet by a coil mounted on the long magnet wherein said step of generating the separate radio frequency field which compensates for the excitation radio frequency field in the area of the long magnet comprises generating the separate compensating radio frequency field in a manner directed toward and equal in strength to the generated radio frequency field in the area of the long magnet.

2. An improved logging apparatus using nuclear magnetic resonance having at least one long magnet magnetized perpendicular to its longitudinal axis and at least one radio frequency coil producing an excitation radio frequency field, the at least one coil having a plurality of turns lying on planes parallel to the longitudinal axis of the long magnet and parallel to a direction of magnetization of the long magnet, a matching device, a radio frequency pulse generator, and a nuclear magnetic resonance signal receiver, wherein the at least one radio frequency coil is connected to a first input of the matching device, an output of the radio pulse generator is connected to a second input of the matching device, and an output of the matching device is connected to an input of the nuclear magnetic resonance signal receiver, the improvement comprising:

wherein the long magnet is made of a conducting rare-earth material, has an elongated parallelepiped form, and has a direction of magnetization perpendicular to a wide lateral surface of the long magnet;

wherein a width of the long magnet is at least double a width of a narrow side of the long magnet;

wherein the at least one radio frequency coil is wound on a cylindrical frame which is separate from and outside of the long magnet;

wherein a diameter of the cylindrical frame is at least equal to the length of a diagonal of the cross section of the long magnet located inside the cylindrical frame;

wherein the plurality of turns of the at least one radio frequency coil are arranged in symmetric sectors located opposite the wide lateral surface of the conducting rare-earth material; and wherein the long magnet has a means for compensating in addition to, and for, the generated at least one excitation radio frequency field in the area of the long magnet that is mounted on and coiled around the long magnet.

3. The apparatus according to claim 2:

wherein said means for compensating in addition to and for the generated at least one excitation radio frequency field in the area of the long magnet comprises a compensating coil wound on the long magnet, having a plurality of turns lying on planes parallel to the narrow surface of the long magnet;

wherein a beginning of the compensating coil is connected to a common point on the matching device, and an ending of the compensating coil is connected to one end of the at least one radio frequency coil; and wherein the ratio of the number of turns of the at least one radio frequency coil to the number of turns of the compensating coil is equal to the ratio of the diameter of the at least one radio frequency coil to the thickness of the long magnet.

4. An improved logging method using nuclear magnetic resonance including generating a static magnetic field near a wellbore using at least one long magnet having a direction of magnetization passing predominantly perpendicular to a longitudinal axis of the long magnet, generating an excitation radio frequency field in a region in a direction perpendicular to the longitudinal axis of the long magnet and to the static magnetic field, and receiving nuclear magnetic resonance signals, the improvement comprising:

wherein the long magnet used in the step of generating the static magnetic field is made of a conducting rare-earth material; and generating an additional, separate radio frequency field which compensates for the excitation radio frequency field in the area of the long magnet.

5. The method according to claim 4, wherein said step of generating the additional, separate radio frequency field which compensates for the excitation radio frequency field in the area of the long magnet comprises generating the additional, separate compensating radio frequency field in a manner directed toward and equal in strength to the generated excitation radio frequency field in the area of the long magnet.

* * * * *